United States Patent [19]

Cowles et al.

[11] Patent Number: 5,343,001
[45] Date of Patent: * Aug. 30, 1994

[54] ACOUSTIC MULTI-MODE LOGGING DEVICE ADAPTED TO DECOUPLE NOISE WITHIN A SEMI-RIGID RECEIVER ARRAY

[75] Inventors: Christopher S. Cowles, Houston; Jacques P. Leveille, Bellaire; Paul J. Hatchell, Houston; Jesus A. Mireles, Sugar Land; Robert D. Clifton, Houston, all of Tex.

[73] Assignee: Shell Oil Company, Houston, Tex.

[*] Notice: The portion of the term of this patent subsequent to Feb. 22, 2011 has been disclaimed.

[21] Appl. No.: 960,166
[22] Filed: Oct. 13, 1992
[51] Int. Cl.$^5$ .............................. G01V 1/40
[52] U.S. Cl. .................... 181/102; 367/25
[58] Field of Search ............. 367/25, 911, 153, 154; 181/102, 104; 73/151, 152; 340/853.1, 854.3

[56] References Cited

U.S. PATENT DOCUMENTS

| | | |
|---|---|---|
| 2,757,358 | 7/1956 | Ely . |
| 2,834,421 | 5/1958 | Summers . |
| 2,938,592 | 5/1960 | Charske et al. . |
| 3,009,131 | 11/1961 | Woodworth . |
| 3,161,256 | 12/1964 | Pardue . |
| 3,191,143 | 6/1965 | Pardue . |
| 3,364,463 | 1/1968 | Pardue . |
| 3,381,267 | 4/1968 | Cubberly, Jr. et al. . |
| 3,593,255 | 7/1971 | White . |
| 3,991,850 | 11/1976 | Escaron . |
| 4,020,452 | 4/1977 | Trouiller et al. . |
| 4,383,308 | 5/1983 | Caldwell . |
| 4,432,077 | 2/1984 | Alihali et al. . |
| 4,516,228 | 5/1985 | Zemanek, Jr. . |
| 4,543,648 | 9/1985 | Hsu . |
| 4,594,691 | 6/1986 | Kimball et al. . |
| 4,606,014 | 8/1986 | Winbow et al. . |
| 4,633,248 | 12/1986 | Small ..................... 367/25 |
| 4,649,526 | 3/1987 | Winbow et al. . |
| 4,703,460 | 10/1987 | Kurkjian et al. . |
| 4,718,046 | 1/1988 | Medlin . |
| 4,736,345 | 4/1988 | Keckler et al. ..................... 367/20 |
| 4,774,693 | 9/1988 | Winbow et al. . |
| 4,779,236 | 10/1988 | Sondergeld . |
| 4,789,968 | 12/1988 | Rice . |
| 4,832,148 | 5/1989 | Becker et al. . |
| 4,855,963 | 8/1989 | Winbow et al. . |
| 4,862,991 | 9/1989 | Hoyle et al. . |
| 4,872,526 | 10/1989 | Wignall et al. . |
| 4,893,290 | 1/1990 | McNeel et al. ..................... 367/911 |
| 4,899,844 | 2/1990 | Katahara et al. . |
| 4,932,003 | 6/1990 | Winbow et al. . |
| 4,951,267 | 8/1990 | Chang et al. . |
| 5,027,331 | 6/1991 | Winbow et al. . |
| 5,036,945 | 8/1991 | Hoyle et al. . |

OTHER PUBLICATIONS

Gianotto, J. M., "Poled Ferroelectric Ceramic Devices" in Fink, Donald G. and Donald Christiansen, *Electronics Engineers' Handbook*, pp. 7-18 to 7-21. Third Edition. McGraw-Hill.

Rosenbaum, J. H. "Synthetic Microseismograms: Logging in Porours Formations," *Geophysics* vol. 39, No. 1 (Feb. 1974), pp. 14-32.

Roever, W. H., J. H. Rosenbaum and T. F. Vining, "Acoustic waves from an impulsive source in a fluid--filled borehole," *J. Acoust. Soc. Am.*, vol. 55, No. 6 (Jun. 1974) pp. 1144-1157.

*Primary Examiner*—Ian J. Lobo
*Attorney, Agent, or Firm*—Fred Reynolds, Jr.

[57] ABSTRACT

A multi-mode receiver sonde having individual receiver stations within a semi-rigid receiver array. The semi-rigid receiver array is adapted to decouple noise (tool-mode noise and/or road-noise) at one location within the receiver array from other locations within the receiver array by using compliant spacers between the receiver stations to absorb and scatter the noise.

In preferred embodiments, multi-mode receiver stations are presented which provide a common ground for output signals detected by the receiver stations. Additional embodiments provide for combining the output signals into composite signals which represent a selected borehole propagation mode.

In one highly preferred embodiment, the use of transducer detectors which have a flat frequency response over a selected bandwidth allows for accurate comparisons between composite signals so that changes in phase and amplitude over distance and time can be determined.

43 Claims, 4 Drawing Sheets

FIG.3A
FIG.3B
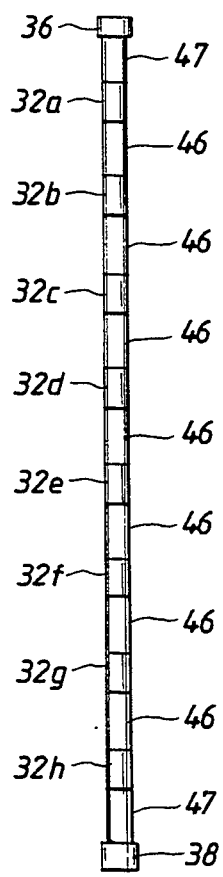
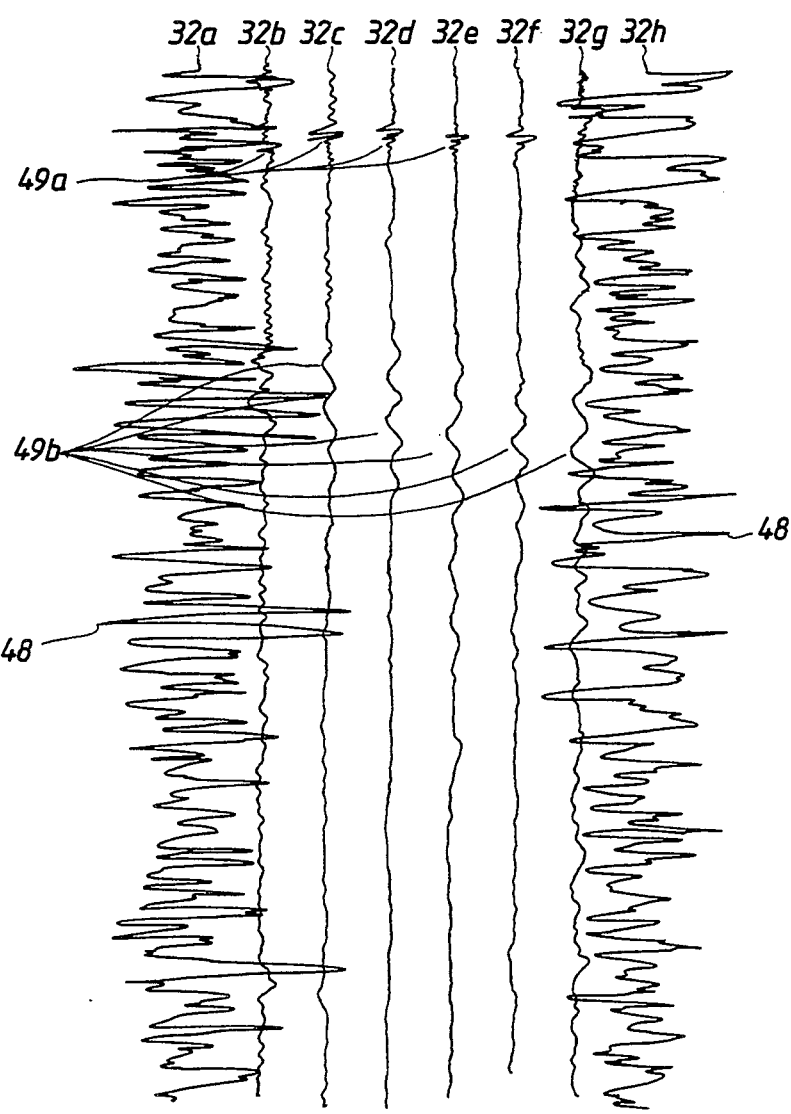

ACOUSTIC MULTI-MODE LOGGING DEVICE ADAPTED TO DECOUPLE NOISE WITHIN A SEMI-RIGID RECEIVER ARRAY

FIELD OF THE INVENTION

This invention relates to acoustic well logging in general and more particularly, to reducing noise in multi-mode acoustic well logging receivers.

BACKGROUND OF THE INVENTION

Conventional acoustic logging of earth formations traversed by a liquid-filled borehole is accomplished by lowering into the borehole a logging tool suspended on an armored communication cable. The typical logging tool will usually incorporate several acoustic transducers. At least one transducer will be used as a transmitter to generate acoustic signals which are to be detected by one or more transducers that act as receivers. The desired detected signals would be representative of the energy from the transmitter which travels through the borehole or the surrounding formation to the detector and it would not contain anything else, such as, a "tool-mode noise" or a "road noise" which will be discussed hereinafter.

The acoustic signal generated by the transmitter centered in the borehole can be a symmetrical or an asymmetrical compressional waveform with respect to the borehole axis in the fluid. When the generated compressional wave travels through the liquid in the borehole and strikes the borehole wall, various types of elastic and guided waves, which will be referred to herein as borehole waves, are produced as the earth—borehole response to the generated signals. The types of borehole waves produced have different velocities and amplitude—frequency characteristics. Since these borehole waves are usually detected at a receiver transducer through a fluid coupling, borehole waves will also be referred to herein as acoustic waves or signals. Because these acoustic wave types have different velocities and characteristics, various methods are used to enhance the ability of the logging tool to detect the waveforms so that the wave types may be distinguished during processing. Through the processing of these waveforms, particularly through the amplitude and phase relationships of the waveforms as a function of time and distance, the viscoelastic properties of the earth formations surrounding the borehole can be deduced, such as, in particular, the compressional and shear wave speeds of the earth formations.

Transducers used as receiver elements (also referred to herein as transducer detectors) may be combined to form a receiver station. One type of transducer, a piezoelectric transducer, has been used for the receiver element. Prior art (as one example, U.S. Pat. No. 4,649,526) has taught: the use of multipole logging tools in subsurface exploration, the addition/subtraction of the output of a plurality of detector transducers to form one combined signal (a composite signal) for each receiver station, and the use of piezoelectric elements for detector transducers. The combination of outputs can take several forms or modes. The selective addition and/or subtraction of signals to form the composite signals from specifically located piezoelectric detector elements at each receiver station is used to detect various borehole-propagation modes. When used in this manner, the following modes of borehole propagation can be detected: monopole, dipole, quadrupole, octopole and other borehole-propagation modes which may be initiated by selected multipole transmitters.

A logging tool generally consists of several receiver stations, spaced at some interval along the body of the tool. The collection of receiver stations will be referred to herein as a receiver array.

Preferably, the data collected by the receiver will only include an accurate representation of the earth (or the borehole) response to the signals generated from the transmitters.

However, signals obtained from conventional acoustic multipole logging tools are subject to various noises such as "tool-mode noise" and "road noise" and they may also be affected by transducer detector resonance effects. Either of these problems limits the ability of the tools to obtain signals from the detector transducers which accurately and only represent the response of the borehole environment to the various propagation modes of the generated signals.

TRANSDUCER RESONANCE, AMPLITUDE AND PHASE DISTORTION

Transducers, and in particular, piezoelectric detectors, have resonant frequencies which are dependent upon the type of material used to make the transducer and the desired mode of operation. The deleterious effects of resonant frequencies which we discuss herein will apply to all and every resonances of a transducer; therefore, for reasons which will become obvious hereinafter, the resonant frequency discussed herein is assumed to be the lowest or fundamental resonant frequency on a transducer frequency response curve that exhibits the effects of resonance for a given material which is configured in a particular mode of transducer operation. The resonant frequency is determined by the detector geometry, e.g., the shape, length, width, thickness and orientation of the poling axis within the material, for examples see *Electronics Engineering Handbook, Third Edition;* edited by Fink and Christiansen, Poled Ferroelectric Devices by Giannotto, pages 7-19 through 7-21, published by McGraw Hill Book Company, 1989.

A piezoelectric detector will provide an electrical output response signal when subjected to mechanical stress variations across the poling axis. An acoustic field may provide the mechanical stress to the detector. The desired output response from the detector is an electrical signal which represents a component of the variations in the acoustic field (the acoustic signal) in the borehole. In this specification, the mechanical stress variation placed upon the detector is called an input signal.

FIGS. 1A and 1B illustrate representative piezoelectric transducer characteristic frequency response curves for a transducer having a two pole response with a single resonant frequency. They illustrate the effect of a resonant-response region on the output response signal of the detector with respect to the input signal. The horizontal axis of each response curve is a logarithmic frequency scale starting at 100 Hz and ending at 100 kHz. The vertical axis of FIG. 1A shows the ratio of the output response signal amplitude to the input signal amplitude in decibels (dB) over the frequency range with the assumption that the amplitude of the input signal is constant across the frequency spectrum. FIG. 1A shows the resonant frequency for this detector to be at approximately 10 kHz. The resonant-response region defined here as the frequency region where the amplitude ratio is larger than some prescribed value of this detector is around 3 kHz to 13 kHz.

A detector transducer has higher sensitivity to input signals within a resonant-response region because input signals within this resonance region give output signals which are magnified by the resonance effect, compared to input signals of the same amplitude outside the resonance region. If the frequencies of the input signal for the transducer detector in FIG. 1A are above 13 kHz, the output signal is proportionally smaller than the response to the input signals within the resonant-response region, and the higher the frequency of the input signal, the smaller the output response signal.

Using detectors which provide a greater response to input signals within the resonant-response region has the advantage of reducing the complexity of the receiver electronics, allowing the use of electronic components which do not have to have the sensitivity that would be required if the resonant-response region were not used.

In spite of the substantial advantages of using acoustic tools which take advantage of the resonant-response region of transducer detectors, there are some disadvantages. The output response signal is subject to undesirable frequency response characteristics in amplitude and phase between the input acoustic signal to the detector and the output response signal from the detector. These undesirable characteristics will be referred to herein as "amplitude distortion" and "phase distortion".

Returning to FIG. 1A, it shows that within the resonant-response region, the amplitude of an output response signal to a constant input signal will vary with respect to how close the spectral components of the signal are to the resonant frequency; consequently, there is amplitude distortion in the output response signal in relationship to the input signal. Whereas, if the output response signal had spectral components within the frequency range of 100 Hz to approximately 3 kHz, the detector provides a flat amplitude response over this frequency range because the relationship between the amplitude of the output signal and the input signal is approximately a constant ratio. This constant amplitude ratio region will be referred to herein as a flat amplitude response region.

FIG. 1B shows on the vertical axis, the phase difference between the output response signal and the constant input signal in degrees. At the resonant frequency, the phase shift (or phase difference) between the input acoustic signal and the output response signal is 90 degrees. Across the resonant-response region of FIG. 1B, the phase shift could vary as much as 180 degrees. Whereas, between 100 Hz and approximately 3 kHz there is a region where there is significantly little phase difference between the input signal and the output signal. This approximately constant phase-difference output response region will be referred to herein as a flat phase response region.

The flat amplitude response region and the flat phase response region will be referred to collectively herein as a flat frequency response region.

When detector stations are used for detecting signals within the resonant-response region, the composite signals may be degraded due to amplitude and phase distortion if the resonant-response region and other frequency response characteristics of each element of the receiver stations are not identical.

For example, a dipole borehole wave produces an acoustic field in the borehole which is antisymmetric (i.e. equal amplitude and a phase difference of 180°) upon refection through the borehole axis. A dipole receiver station could be composed of two transducers detectors located on diametrically opposite sides of the centered logging tool. If the resonant-response regions of the two transducers were identical, then summing the output responses of both transducers would yield a null response at all frequencies since the input dipole signal is antisymmetric, while differencing 15 the signals received at the two transducers and halving the results would yield a true measurement of the amplitude spectrum of the acoustic fields in the borehole. However, if the resonance-response regions were not identical, summing and/or differencing the responses of the transducers would give an erroneous representation of the acoustic signal in the borehole.

It is not possible to obtain transducers with exactly matched resonant-response regions because in a downhole environment where the temperature can approach 200 degrees Centigrade and the pressure can exceed 10,000 psi (68,940,000 Pascal); small differences in transducers of conducting and material properties, especially, piezoelectric transducers, can result in differences in the resonant frequencies for the elevated temperature and pressure. From 1B, it shows that even a small difference between the resonant frequencies of two detectors can result in a substantial mismatch in the phase responses of the detectors within the resonant-response region.

TOOL-MODE NOISE AND ROAD NOISE

Noise in this specification is energy travelling within or on the surface of the logging tool that is not representative of the earth - borehole response to the transmitted signals. The term "noise" when used in this specification shall include tool-mode noise and/or road noise. Noise may interfere with the ability of the detector transducers to provide an accurate representation of the earth - borehole response. This may occur when noise of sufficient amplitude is detected along with the borehole waves. Noise can be produced by any elastic waves traveling on the surface of or within the body of the acoustic logging tool.

Road noise is a noise at low frequency (approximately in the range of 0–1 kHz) due to the banging of the tool against the side of the borehole. Although most serious for transverse wave detection, it is also a problem for Stoneley wave detection. The conventional method for reducing the effects of road-noise on the signal is summing many signals using the incoherence of the roadnoise. But summing or stacking "N" traces only reduces the noise by $$\frac{1}{\sqrt{N}},$$

and since the road-noise could be hundreds of times larger than the signal of interest, it is still often a problem.

Tool-modes are various waves (modes) propagating along or within the logging tool. These waves are referred to herein as "tool-mode" noise. This noise often occurs at frequencies close to the borehole signals and the noise also propagates at velocities close to the velocities of the borehole signals. Tool-mode noise is coherent and cannot be suppressed by stacking.

If tool-mode noise and road-noise could be decoupled within the receiver array so that it does not propagate throughout the array to couple to all of the transducer detectors in the array and if the acoustic signals could be detected so that they are not subject to amplitude and frequency distortion between the input signal and the output response signal, it would be possible to obtain composite signals which would accurately reflect selected borehole propagation modes. The composite signals from different receiver stations could then be used for an accurate determination of the changes in phase and amplitude of the borehole response over time and distance, from which formation properties can be inferred.

In addition, borehole waves are subject to the effect of resonances. The borehole resonant frequencies are dependent in part upon the mode of propagation of the transmitted signal as well as borehole geometry. The use of a multi-mode receiver sonde having a flat frequency response region over a selected bandwidth which includes significantly all of the borehole resonant-response regions of interest would provide in a single receiver sonde the ability to accurately detect the amplitude and phase of the acoustic signals across any borehole resonant-response region that is excited by any transmission mode of interest.

SUMMARY OF THE INVENTION

An object of this invention is to provide an acoustic logging receiver array adapted to significantly prohibit (i.e., decouple) any noise across the receiver array, thereby reducing noise at any transducer detector in the array.

Another object of this invention is to provide an acoustic logging receiver array which provides output response signals from the receiver stations which have substantially the same amplitude and phase response to a common input signal, thereby allowing faithful recording of borehole acoustic signals.

In accordance with some objects of the present invention, there is provided a receiver sonde adapted to decouple noise (tool-mode noise and road-noise) within a semi-rigid receiver array so that the noise does not propagate across any portion of the array, thus, preventing (or substantially reducing) the tool-mode noise from coupling to transducers in the array. In one particular representative embodiment, the semi-rigid receiver array includes: a top and bottom bulkhead and semi-rigid receiver array-elements. The semi-rigid receiver array-elements include rigid and massive receiver stations (receiving chassis-elements) to which detector transducers are attached, and compliant, light spacers. The compliant spacers are positioned within the receiver array to separate the receiver stations from each other and from the top and bottom bulkhead- The compliant spacers also act to maintain the receiver stations in their approximately fixed position within the receiver array.

Noise cannot propagate across any portion of the receiver array for at least two reasons. Firstly, the compliant elements act as vibration isolators, which absorb most of the energy propagating across them. Secondly, because of the large disparity in the elastic properties of the compliant spacers and the receiver chassis elements, most energy not absorbed across the compliant spacers is scattered at the junction between the compliant spacers and the receiver chassis elements and further absorbed within the body of the receiver array. As such, the entire receiver array acts as a lumped vibration isolator which only allows very low frequency tool-noise (outside the bandwidth of interest) to propagate across the receiver array.

In addition, other embodiments are presented which provide for wide-band detection of acoustic signals within the borehole. Wide-band detection in this specification refers to the detecting of an acoustic signal within a selected bandwidth which has an approximately flat frequency response for the receiver transducer, i.e constant ratio in amplitude and substantially little phase difference between the input signal and the output signal of the detector. Consequently, the output signal is a faithful representation of the input signal. Thus, an accurate determination of the acoustic signals in the borehole and of the changes in phase and amplitude between acoustic signals detected by separated receiver stations is obtained by the wide-band detection of acoustic signals. Wide-band detection is achieved by selecting transducer detectors which have approximately the same frequency response characteristics to an input signal and whose lowest resonant-response region is above the highest frequency of the selected bandwidth for the detected signals.

Other embodiments are also provided, such as a receiver array which has a common electrical ground for all output response signals from the transducer detectors on a receiver station or for all of the output response signals in a receiver array. Another embodiment is a receiver sonde which has a multi-mode capability for detecting acoustic signals by combining individual signals into composite signals which are representative of various borehole-propagation modes.

These and other objects and advantages of the present invention will no doubt become apparent to those of skill in the art after having read the following detailed description of the preferred embodiments which are contained herein and illustrated by various figures.

The invention encompasses the heretofore described preferred embodiments as well as other embodiments as are described hereinafter and as will be apparent to those of skill in the art.

BRIEF DESCRIPTION OF THE DRAWINGS

FIG. 3A is a simplified perspective illustration of an experimental receiver array having eight receiver stations.

FIG. 3B is a representation of the signals received by the transducer detectors located on the experimental receiver array of FIG. 3A.

DETAILED DESCRIPTION OF THE PREFERRED EMBODIMENTS

The invention is an acoustic logging receiver apparatus adapted to decouple noise within one portion of a receiver array from detector transducers located in the other portions of the receiver array. The invention may also include wide-band signal detection which in this specification means the detection of signals which have substantially little amplitude and phase distortion between an output response signal from the detector and an input signal to the detector over a selected bandwidth. The apparatus may also include multi-mode detection for different borehole-propagation modes (monopole, dipole, quadrupole, octopole, etc.). The apparatus may be mounted, preferably, in a separate sonde from the transmitters, or in combination with one or more acoustic transmitters mounted within the same sonde. In addition, this receiver apparatus may be used in conjunction with acoustic signals generated in or outside of the borehole to detect signals.

Figure 2:
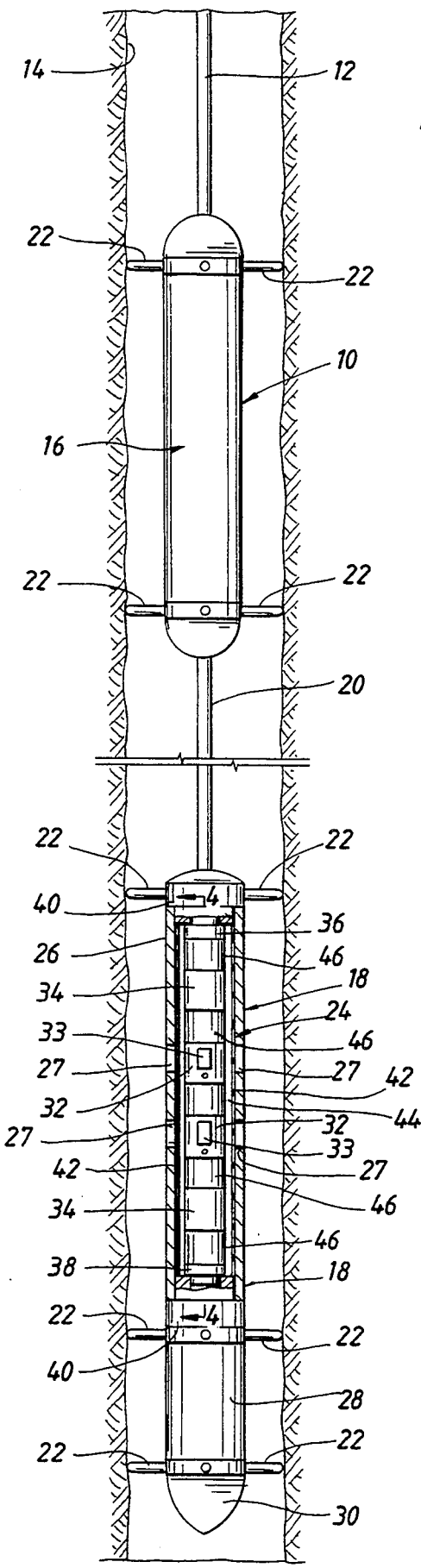
FIG. 2 is a simplified perspective illustration of a well logging tool in a borehole with partial cutaway view of one embodiment of a semi-rigid receiver array of the present invention.

FIG. 2 is a simplified perspective view of a well logging tool according to one particular embodiment of the present invention.

Well logging tool 10 is shown suspended from communication cable 12 in a borehole 14 containing a liquid. In this embodiment, a transmitter sonde 16 is shown located above a receiver sonde 18. Between these sondes is a tube spacer 20. Attached to the outside surface and around transmitter sonde 16 and receiver sonde 18 are flexible rubber "finger" centralizers 22 which act to maintain the sondes in the center of the borehole 14.

The exterior of the transmitter sonde 16 is typically an elongated metallic tube with openings for acoustic windows (not shown in FIG. 2) to allow acoustic signals to be transmitted from the interior of the transmitter sonde into the fluid of the borehole.

The transmitter sonde 16 contains one or more acoustic transmitters capable of transmitting compressional waves into the borehole fluid in at least one or more of the following transmission modes: monopole, dipole, quadrupole, octopole or other forms of multipole transmission. In addition, the transmitter sonde 16 may contain additional components used for the collection of downhole data such as a gamma ray detector and/or instrumentation for sending data to the surface or for receiving control signals from the surface. The use of the descriptive term "transmitter sonde" is not meant in this specification to limit the transmitter sonde 16 to containing only acoustic transmitters.

The receiver sonde 18 of this embodiment contains a semi-rigid receiver array 24 (shown in a simplified perspective cut away view and in a partial cross section) which is surrounded by an exterior jacket 26 (shown in cross section). The exterior jacket 26 of this particular embodiment is a tubular metallic shield with acoustic windows 27. The receiver sonde 18 also includes a receiver electronics section 28. Attached to the receiver sonde 18 of this particular embodiment is a sinker bar or hole finder 30.

The receiver electronics section 28 contains a remotely controlled electronics package that includes a gain control. The electronics package of this embodiment also contains a composite signal means for combining signals detected within the receiver array 24. The electronics section 28 also suitably contains an electronics package which sends signals to the surface by way of the armored communication cable 12. The communication cable 12 is connected to the receiver electronics section 28 by internal wiring. The receiver electronics section 28 also suitably contains additional components used for collecting downhole data such as a magnetometer and/or other electronic components. The use of the descriptive term "electronics section" is not meant in this specification to limit this section to containing only electronic components related to acoustic signal acquisition.

The semi-rigid receiver array 24 of this particular embodiment, includes two receiver stations (receiving chassis-elements) 32 having detector transducers 33 attached thereon and weights (non-receiving chassis-elements) 34 positioned above and below the receiver stations 32 and in proximity to a top bulkhead 36 and a bottom bulkhead 38. The top bulkhead 36 and bottom bulkhead 38 are mechanically and electrically coupled to exterior bulkheads 40. The exterior bulkheads help to maintain a liquid tight seal on the semi-rigid receiver array and also allow for mechanical and electrical coupling to the rest of the well logging tool. An inner jacket 42 (shown in cross section in FIG. 2) provides the liquid seal for the longitudinal periphery of the semi-rigid receiver array by acting as a barrier between the liquid of the borehole and the interior of the receiver array. In this embodiment, the inner jacket 42 is an elastomeric sleeve. The interior of the receiver array 24 is filled with an insulating fluid 44.

In other embodiments, the inner jacket may be used without an exterior jacket 26, or the inner jacket and the outer jacket are suitably combined such that there is an elongated rigid tube with elastomeric acoustic windows to allow the acoustic signal to enter the receiver array to be detected- In such a case, the term "inner jacket" will also apply to this type of configuration in this specification.

The receiver stations 32 (receiving chassis-elements) and weights 34 (non-receiving chassis-elements), in the embodiment of FIG. 2, are separated and maintained in an approximate fixed position by the compliant spacers 46 with respect to: each other, the top and bottom bulkhead, and their longitudinal location within the receiver array 24. In this particular embodiment, the compliant spacers are tubular in shape and are formed of an elastomeric material. The compliant (semi-rigid) spacers fix the position of receiver stations 32 in proximity to the acoustic windows 27 in the outer jacket 26.

NOISE WITHIN A RECEIVER ARRAY

In some conventional acoustic logging tools, the transmitter sonde 16 and the receiver sonde 18 may be coupled together into a single continuous tube. However, with a single sonde configuration, the signals generated by the transmitters for transmission into the borehole may also propagate within the body or on the surface of logging tool. If these signals within or on the surface of the logging tool are picked up by the detectors, these signals could interfere with the ability of the logging tool to obtain from the borehole usable signals which contain the borehole or earth response to the transmitted signals. Various methods have been developed to reduce the impact of the coupling of the transmitter signals which propagate within the body of the tool to the output response signal from the detectors.

One such conventional method is the separation of the transmitter sonde from the receiver sonde by using the tube spacer 20 shown in FIG. 2. However, other forms of the noise may affect the receiver sonde, such as borehole waves coupling to the surface of or interior components of the receiver sonde or road noise coupling to the receiver sonde due to the scraping and banging of the receiver sonde against the side of the borehole. Any of these noises may be detected by the transducer detectors. The output response signals from the detectors would then include both the acoustic signal from the borehole and the noise from the logging tool.

One major path for tool-mode noise and/or road-noise to propagate in the receiver array and to be picked up by the transducer detector is via the chassis upon which the detector is mounted in the receiver array.

A conventional receiver array in prior art has a single rigid chassis made of one continuous (or solid) component which will be referred to herein as an "array-chassis" that may be rigidly coupled to the rest of the receiver sonde. The array-chassis supports a plurality of receiver stations longitudinally within the array. The prior art arrangement for supporting receiver stations on a rigid continuous array-chassis allows the noise to move within or on the surface of the array-chassis to couple to all of the detector transducers. The noise may enter the array-chassis through connections between the array and the body of the receiver sonde or through the insulating fluid to various portions of the array. There is no specifically included active mechanism within this rigid solid array to prevent frequency components of the noise near the resonant frequencies of the array-chassis from resonating within the array-chassis. These resonating components of the noise could have significant amplitudes. In addition, there are no specifically included active mechanisms within this array-chassis to reduce or prevent non-harmonic frequency components of the noise, i.e., frequency components which are not near the resonant frequencies of the array-chassis. Thus, the array-chassis provides an ideal propagation path for the noise which enters the array from any location to couple via the array-chassis to any or all of the transducer detectors which are positioned throughout the receiver array.

DECOUPLING OF NOISE WITHIN THE RECEIVER ARRAY

This invention decouples noise in one portion of the receiver array from the transducer detectors located in another portion of the receiver array. The term "decouple" in this specification means that energy which enters the receiver array at any point in the array cannot propagate (or at least is significantly reduced in amplitude) to other portions of the array. The net effect is that energy can only enter the receiver array at a transducer detector via the borehole fluid, thereby allowing for a true reconstruction (representation) of the acoustic field in the borehole.

Returning to FIG. 2, the decoupling of the noise is accomplished by using compliant spacers 46 between massive receiver elements. A compliant spacer is made up of viscoelastic material which absorbs vibrational energy travelling across it, i.e. it acts as a vibrational isolator. The receiver chassis elements 32 are separated from each other and from the bulk-heads by compliant spacers 46. In this embodiment, the compliant spacers are annular rubber sleeves, which are rigid enough to sustain their shapes and the linear shape of the receiver array. As vibrational energy travels across the receiver array from any point in the array, it is absorbed partially by the compliant spacers. Any energy not absorbed is scattered at the junction between the compliant spacers 46 and the receiving elements 32, because of the large disparity in the elastic properties of the compliant spacer and the receiving chassis element (impedance mismatch). The scattered energy is further absorbed by the compliant spacer and also displaced within the body of the tool. It is evident that the absorption of energy will be cumulative with the number of compliant spacers and compliant spacer-receiver-chassis junctions. As such, the entire receiver array may be viewed as a set of overlapping vibrational isolators. The receiver stations closest to the bulkheads 36 and 38 are particularly susceptible to large road noise or other tool-mode noises which will enter the receiver array at the bulkheads. Whereas introducing a compliant spacer between the bulkhead 36 and 38 and the nearest receiving chassis-element 32 is usually sufficient, in the embodiment of FIG. 2, a non-receiving chassis element 34 is inserted with another compliant spacer 46 between the non-receiving chassis-element 34 and the receiving chassis-element 32. The insertion of the non-receiving chassis-element 34, or weight, allows the introduction of extra compliant spacers for extra absorption of tool-mode energy before it reaches a detector transducer.

The ability of this invention to reduce noise within a semi-rigid receiver array is shown in FIGS. 3A and 3B. FIG. 3A shows a side perspective view of an experimental configuration for a receiver array. This experimental receiver array has eight receiver stations identified as 32a through 32h. Stations 32a through 32h are separated by semi-rigid compliant spacers 46. Station 32a and 32h are also connected directly to the upper and lower bulkheads 36, 38 by rigid annular steel chassis elements 47. FIG. 3B is a representation of the signals received by the detector transducers on receiver stations 32a through 32h of this invention when subjected to a noise. Receiver stations 32a and 32h did not have the benefit of a compliant spacer between the receiver station and the bulkheads 36, 38. It can be seen that noise 48 almost completely overrides two forms of acoustic waves from the borehole, a compressional arrival 49a and a flexural mode arrival 49b at receiver stations 32a and 32h. Whereas, receiver stations 32b through 32g which are separated by compliant spacers and have the benefit of vibrational isolation, provide compressional arrival 49a and flexural mode arrival 49b signals which are not distorted or overridden by the noise 48.

The signals obtained at stations 32b and 32g indicate that some (highly attenuated) noise has been picked up by the transducer detectors of these receiver stations. Whereas, the signals obtained by 32c through 32f have less and in addition, the noise on the signals appears to be about equal. The experimental configuration of FIG. 3B does not ensure that the array provides for equal amounts of decoupling between the receiver stations.

The embodiment of FIG. 2 resolves this problem by using the weights (the non-receiving chassis-elements) 34 to ensure that an equal amount of decoupling is provided at each receiver station (receiving chassis-element) 32. The weights allow for extra compliant spacers and extra scattering centers to be interspersed along the array, particularly between the lower and upper bulkheads and the center of the array.

In other embodiments of this invention, when substantial decoupling of the noise propagating from the bulkheads is obtainable without the use of the weights 34, the non-receiving chassis elements may not be used; or, in other embodiments it may not be necessary to ensure that the amount of decoupling within the receiver array is balanced at each receiver station.

In embodiments of this invention, the number of receiver stations included within each receiver array is determined by the number of signals or the number of composite signals desired from each semi-rigid receiver array.

RECEIVER ARRAY

Preferred embodiments of this invention, as mentioned previously, are capable of decoupling noise within the receiver array and of wide-band detection of an acoustic signal.

Figure 4:
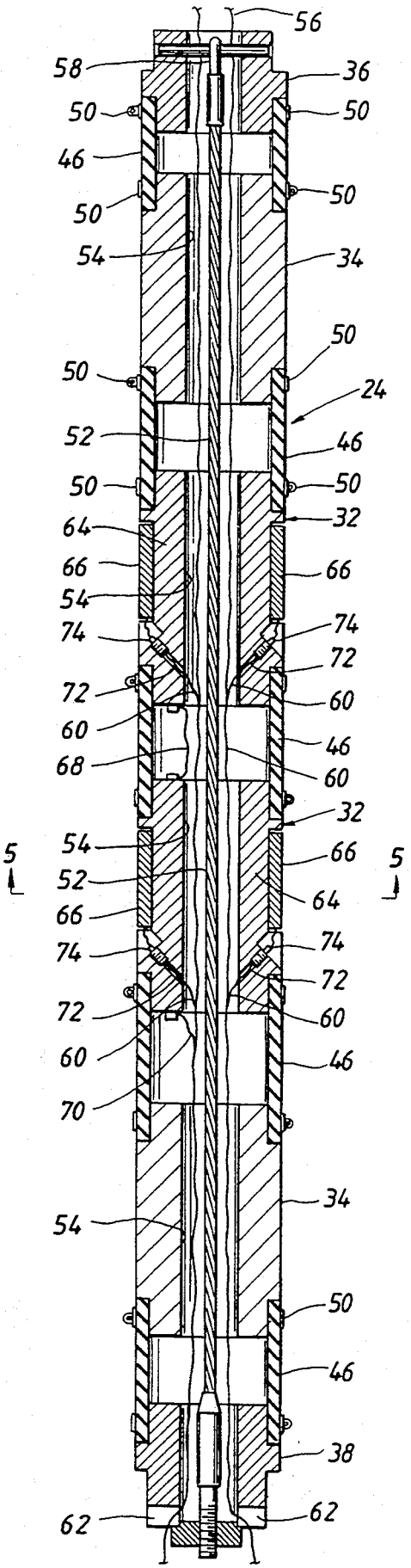
FIG. 4 is a more detailed side cross sectional view of the embodiment of the semi-rigid receiver array of FIG. 2 taken at section 4—4.

FIG. 4 illustrates a more detailed partial side cross sectional view of the semi-rigid receiver array embodiment (the inner jacket is not shown) of FIG. 2 taken at section 4—4. This embodiment is configured for wideband multi-mode detection of an acoustic signal. However, certain features related to this embodiment are also beneficial for conventional downhole acoustic detection techniques and these features should be also be considered within the scope of the claims of this invention.

FIG. 4 illustrates the components of one embodiment of a semi-rigid receiver array which decouples noise in one portion of the receiver array from other portions of the receiver array. This embodiment indicates how the detectors may be wired to obtain a common electrical ground for the detector transducers attached to the receiver station thereby providing for a reduction in the wiring necessary to interconnect the receiver array with the receiver electronics package.

FIG. 4 shows the semi-rigid receiver array 24. The semi-rigid receiver array includes chassis-elements 32, 34 and compliant spacers 46. The embodiment of FIG. 4 has two receiver stations 32. Positioned above and below the receiver stations (receiving chassis-elements) 32 are weights (non-receiving chassis-elements) 34. The weights are located, as previously described, in proximity to the top bulkhead 36 and the bottom bulkhead 38. The receiver stations 32 and weights 34 are separated and maintained in an approximate fixed position with respect to each other, the top and bottom bulkheads, and their longitudinal location within the receiver array 32 by the compliant spacers 46. The compliant spacers 46 are preferably, as previously described, made of an elastomeric viscoelastic material providing a dissipation mechanism to noise. In this particular embodiment, the compliant spacers are annular rubber sleeves and, in preferred embodiments, the compliant spacers separate the receivers stations to have approximately the same distance between the transducers on separated receiver stations.

The compliant spacers 46 are held in position to separate the weights 34, the top and bottom bulkheads 36, 38 and the receiver stations 32 by compression bands 50.

However, other methods known in the art may be used to maintain the semi-rigid spacers in a position between and in contact (or communication) with the chassis-elements 32, 34 and/or the top and bottom bulkheads 36, 38, such as, using screws, clamps or pressure fittings.

In this particular embodiment, a stress cable 52 (although not a necessary component in other embodiments) runs through an opening 54 in the center of the receiver stations 32 and the weights 34. The stress cable 52 is used to support the weight of the receiver array 24 and other components which may be connected to the logging tool below the receiver array 24. In this embodiment, compliant spacers 46 are preferably only rigid enough to maintain the spacing and to prevent the receiver array-elements from contacting the stress cable 52 (the stress cable is a conduction path for noise) when the receiver array 24 is operated in its normal approximately vertical position.

Communication wiring 56 is shown entering the receiver array 24 at the top bulkhead 36 through an opening which is made possible by securing stress cable 52 to the top bulkhead by an eyebolt connection 58. The communications cable 56 passes through the center of the receiver array 24 and joins other wiring such as receiver detector wiring 60. The wiring then passes through the bottom bulkhead 38 by way of notches 62 cut in the lower most part of the bottom bulkhead 38 to connect to the receiver array electronic packages which in this particular embodiment are located in another part of the receiver sonde.

The openings shown at the top and bottom bulkheads 36, 38 and the manner of connecting the stress cable 52 are for illustrative purposes only and may be done in any manner known in this art for fabricating bulkheads for acoustic downhole tools and connecting the various individual parts or components (mechanical and electrical) together to form a well logging tool.

RECEIVER STATION CHASSIS/COMMON ELECTRICAL GROUND

Each receiver station 32 includes a chassis 64, upon which are mounted transducers, preferably pressure-sensitive piezoelectric transducers, 66 to act as transducer detectors. In this particular embodiment, the chassis 64 are formed of an electrically conductive metal. The mounting of the transducers 66 upon the chassis 64 is done in a manner such that one surface of the transducer 66 is in contact with the chassis 64 and electrically continuous with the chassis 64. In this embodiment, the transducer 66 has a conductive electrode plated on the inner face, i.e., the transducer face adjacent to the chassis 64. The inner face of the transducer 66 is bonded to the chassis. Bonding of the inner face of the transducer 66 to the chassis in this particular embodiment provides for a common electrical ground for the output signals of all the detectors mounted in this manner upon a single chassis 64.

Other methods may be used to establish a common electrical ground path in similar embodiments of this receiver array including the use of nonconductive material for the chassis 64 with wiring or conductive plating used to establish a common ground for each detector.

The two chassis 64 of FIG. 4 are shown to be connected electrically by a common ground wire 68 which provides for a common electrical ground between all receiver stations 32 in this embodiment. An instrument ground wire 70 is shown connected to one of the chassis (the lower chassis in this drawing). This wire leaves the receiver array 24 through the bottom bulkhead 38 of this particular embodiment to connect to the receiver electronics package to provide the instrument ground path for the detectors of this receiver array.

In this embodiment, the outer face of each transducer 66 is plated with a conductive electrode. Wiring paths 72 are made through chassis 64 to provide one method to connect detector wiring 60 to the outer face of each transducer 66. Although other methods are known in the art, in this embodiment, the detector wiring 60 is held in place by insulators 74 within the wire path 72, the insulation on the wiring is stripped off of the detector wiring 60 and then connected to the conductive electrode on the outer face of the transducer 66. The opposite end of the detector wiring 60 is connected to the receiver electronics package located below the receiver array.

Figure 5:
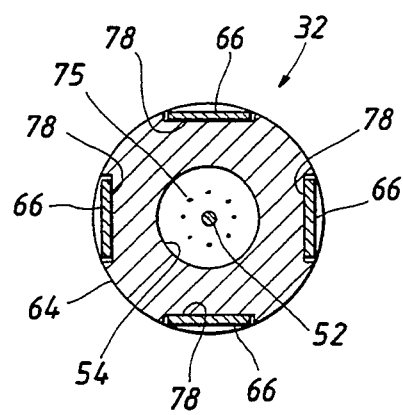
FIG. 5 is a cross sectional bottom view of the embodiment of the receiver station of FIG. 4 taken at section 5—5.

Referring now to FIG. 5, a cross sectional bottom view of the receiver station 32 depicted in FIG. 4 at section 5—5 is provided. In this embodiment, the chassis 64 has a circular periphery (other shapes are suitable) with the opening 54 through the center of the chassis for wiring 75 (for example, communication and detector wiring) and the stress cable 52 to pass through. Transducers 66 are shown on opposite sides of the chassis 64. In this embodiment, a detector cavity 78 is cut into the periphery of chassis 64 to provide a flat surface for the flat bottom surface of the transducers 66 to be electrically and mechanically bonded to the chassis 64. As is apparent to those skilled in the art, other piezoelectric detectors having a different poling axis or shapes may be used for other embodiments. As one example, a piezoelectric detector could be used which has a radial shape with a thickness poling axis. In this case, the bonding surface on the chassis may be shaped to correspond to the shape of the bottom surface of the transducer used for the detector.

CHASSIS TRANSDUCER PLACEMENT FOR MULTI-MODE DETECTION

Four transducers 66 are shown in FIG. 5 for the receiver station. The signals from these four detectors may be combined electronically to form a composite signal (to be described in more detail hereinafter) so that this embodiment of the invention may detect in any of the following modes: monopole, dipole (two dipole modes available, orthogonal to each other) and quadrupole. It is possible to place six, eight, or more transducers in paired combinations on a single chassis to enable a receiver station to detect additional borehole-propagation modes. A paired combination is two transducers with one transducer having a corresponding transducer on the opposite side of the chassis. Each paired combination is separated from the other paired combinations and other individual detectors by equal spacing around the periphery of the chassis. For example, FIG. 5 shows two paired combinations of detectors with axial locations on the periphery with respect to the center of the chassis of 90 degrees of angular separation or spacing between each transducer detector. The alignment of paired combinations of detectors with respect to the center of a borehole to obtain different borehole-propagation modes with detectors is well known in the art.

Figure 6:
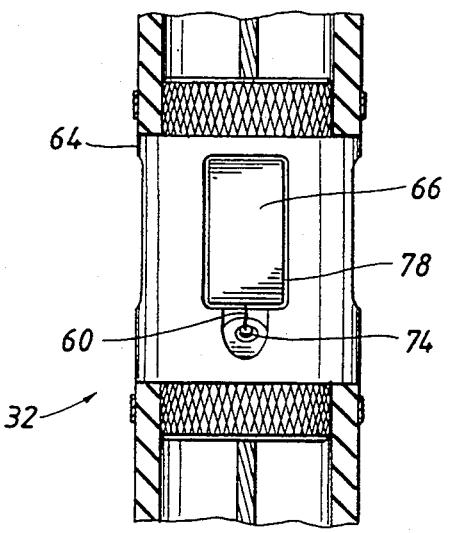
FIG. 6 is a perspective side view of one embodiment of a receiver station based upon one embodiment of the receiver station shown in FIG. 5.

Referring now to FIG. 6, a perspective side view of the receiver station 32 of the embodiment of FIG. 5 is shown. In the cavity 78 on chassis 64 is a pressure-sensitive transducer 66. Detector wiring 60 is shown connected to the outer face of transducer 66 and insulator 74 is shown isolating the detector wiring 60 from chassis 64. In this embodiment, transducer 66 is a rectangular cut pressure-sensitive piezoelectric detector poled in the thickness direction. This mode of piezoelectric transducer operation is referred to as the TE (thickness expansion) mode.

The TE mode is preferred for this embodiment. The thickness of the piezoelectric detector, in general, determines the resonant frequency of this mode of operation. By using this particular mode, the size of the detectors may be reduced so that the detectors approach a point source, with respect to the distance between separate receiver stations, for the detection of acoustic signals from the borehole. This provides a more accurate indication of spatial resolution between the same signals detected on different receiver stations. In some prior art conventional detection modes which did not use the TE mode, the detectors may have been selected because their resonant-response region overlaps the particular borehole resonance-response region where signals are to be detected. Conventional detectors selected in this manner could approach 5 inches in length so that the resonance-response region of the detectors could overlap the borehole resonance-response region. If the receiver stations had separation distances of 6 inches, it was not possible in this conventional form of detection to accurately determine separation distances between the signals detected on the separate receiver stations because the acoustic signals could have been detected at any location along the length of each detector.

Since a TE mode detector can be made smaller without affecting the resonant-response characteristics of the detector, more detectors may be placed around the periphery of the receiver station. Thus, when the acoustic tool uses smaller detectors, it may detect a larger number of borehole-propagation detection modes.

However, in general, the smaller the size of the detector, the smaller the output response signal. Consequently, the output response signals of an embodiment having small detectors, in particularly the TE mode, may require substantially more amplification than conventional larger detectors.

Additionally, in this embodiment, as well as similar embodiments, it is preferred that the poling axis of each detector be mounted in the same poling direction with respect to the center of the chassis, i.e. all facing radially outward or all radially inward, so that a common ground system for different borehole-propagation modes is established by providing a common polarity for the output response signals on each receiver station.

It is also possible, as indicated previously, to use other shapes of detectors for other embodiments of this invention than the rectangular shape shown for the thickness poled detector transducers of this embodiment such as a square or circular shape.

This invention also contemplates the use of piezoelectric detectors which are formed of a plurality of single piezoelectric elements joined to form a single detector element, such as, for example, but not limited to, a bender bar transducer. One possible arrangement for a bender bar transducer would be to attach the bender bar to the sides of a cavity such as the cavity 78 shown in FIG. 6 so that the detecting bender bar surfaces (the outer face and inner face) are not restricted in movement. A common ground wire connection may, as an example, be made to the lower surface of each bender bar.

WIDE-BAND TRANSDUCER SELECTION CRITERIA

Figure 1A:
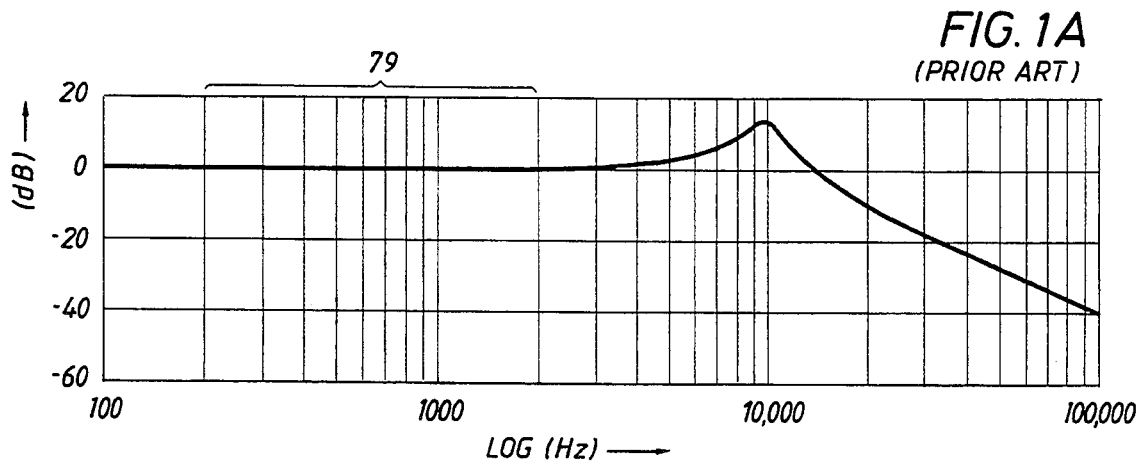
FIG. 1A is a prior art representation of a transducer amplitude vs. frequency response characteristic curve.
Figure 1B:
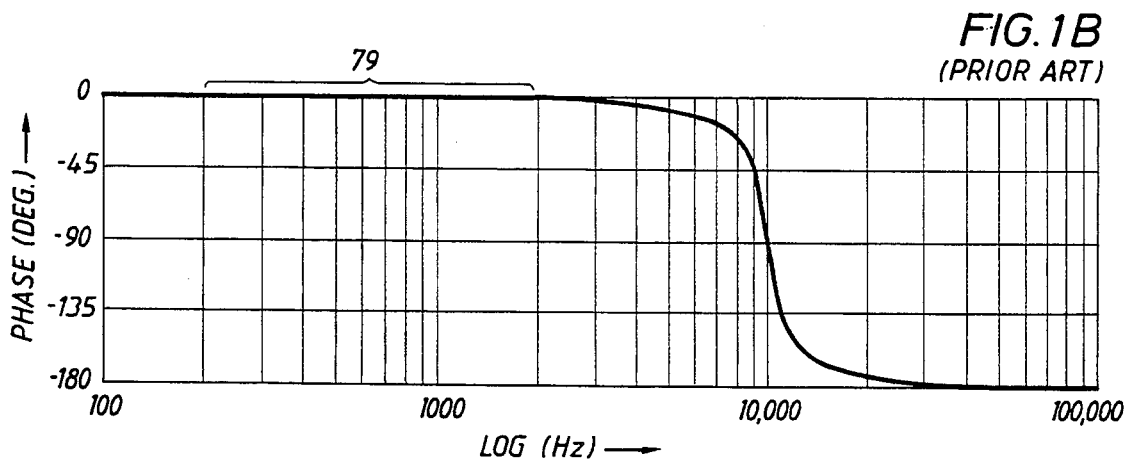
FIG. 1B is a prior art representation of a transducer phase vs. frequency response characteristic curve featuring the same representative transducer as FIG. 1A.

In one preferred embodiment for the wide-band detection of acoustic signals of this invention, it is recommended that the resonant frequency of the transducer detector, and in particular for a piezoelectric detector, be on the order of ten times or more than the maximum frequency within the selected bandwidth. For example, returning to FIGS. 1A and 1B, using a selected bandwidth of 200 to 2,000 Hz in the signal band designated as 79, the transducer having this frequency output response curve would not meet the before mentioned criteria because it has a resonant frequency of approximately 10 kHz with a departure from the flat frequency response characteristics at approximately 3 kHz. Even though the response of the selected bandwidth 79 is within the approximately flat portion of the frequency response curves on FIGS. 1A and 1B, this transducer would not be acceptable in this particular preferred embodiment.

The transducer that is selected to meet the criteria of this example has a resonant frequency of at least 20 kHz. All transducer detectors for the same receiver station and preferably all of the transducer detectors within a receiver array where the composite signals are to be compared receiver station to receiver station should have approximately the same frequency response characteristics to an input signal including having approximately the same lowest resonant frequency. This ensures that the signals in the selected operating bandwidth detected by each detector have the same amplitude for a common input signal and that the signals remain in the approximately flat frequency response region even if the transducers are subject to significant resonant frequency drift under the varying temperatures and pressures of the borehole. Thus, the composite signal of the receiver station is made up of output response signals which have similar frequency responses in amplitude and phase.

An accurate indication of the amplitude and phase of the detected borehole propagation-mode is even more significant when several receiver stations are present in a receiver array and the composite signals from the receiver stations are to be compared during processing. With the selected bandwidth of all the detectors maintained in the approximately flat frequency response region of the frequency response curves of similar detectors, the received signals (or composite signals) within the selected bandwidth will still have the same relationship to each other, i.e., approximately the same frequency response characteristics in amplitude and phase, from receiver station to receiver station in the event the individual resonant frequencies of the detectors drift; thus, accurate determinations of phase and amplitude differences between the composite signals over distance and time are obtained when the composite signals are compared.

However, for wide-band detection, it is not always necessary to ensure that the resonance frequencies of the detectors are 10 times greater than the highest frequency in the selected bandwidth. As long as the detected signals are obtained from similar detectors and the signals within the selected operating bandwidth are below the lowest resonant-response region of the detectors when the signals are detected, wide-band detection is achieved; the detected signals have substantially little amplitude and phase distortion between the input signal and the output response signals.

MULTI-MODE DETECTION

Figure 7:
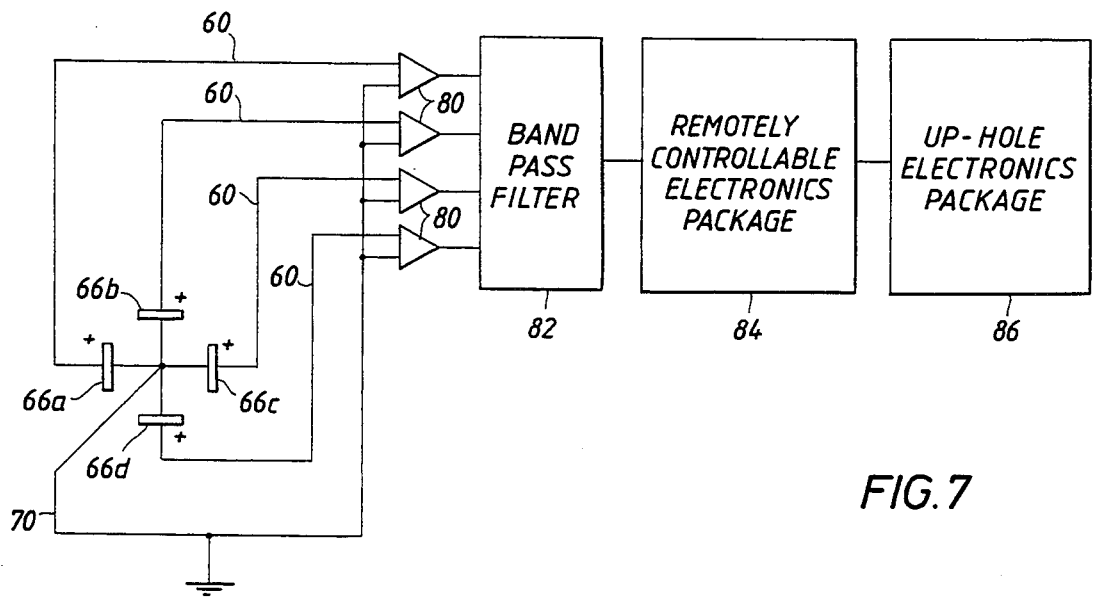
FIG. 7 is a simplified electrical block diagram of one embodiment of a multi-mode receiver station.

From the transducer detectors, the output response signals pass into the receiver electronics section. FIG. 7 is a simplified electrical block diagram of one embodiment of how this invention may operate as a multi-mode receiver station.

In FIG. 7, piezoelectric detector elements $66a$, $66b$, $66c$ and $66d$ are represented to have the same axial configuration as shown by the detectors 66 in FIG. 5, however, the suffixes have been added to show how the detector elements at different axial locations are combined to obtain composite signals.

In this particular embodiment, wire 60 (an ungrounded output wire) connects to the outward face of each transducer detector $66a$, $66b$, $66c$ and $66d$. Each detector is also shown to have a common electrical (ground) potential which is connected to instrument ground wire 70. In one embodiment, the output wire 60 of each detector could be fed directly into a remotely controlled electronics package 82. However, in this preferred embodiment the output of each individual detector is fed to a charge amplifier 80 which amplifies the output response signal and enhances the ability of the receiver electronics to handle low frequencies from the detector.

In this embodiment, a band-pass filter 82 is applied to individual signals before the signals enter the remotely controllable electronics package 84 to remove detector frequency responses outside the selected bandwidth. In other embodiments, a filter may be applied after a composite signal is formed in the electronics package 84 or after the signals have been transmitted to the surface. In addition, other processing techniques may be applied where a band-pass filter is not necessary or desired.

The filtered individual signals then enter the remotely controlled electronics package 84. The electronics package 84 contains a composite signal means (remotely controllable from the surface) for combining the output response signals from the detectors to provide a composite signal which is representative of a borehole-propagation mode for the detected acoustic signal. The composite signal is formed by combining an output response signal from at least one of the detector transducers with at least one output response signal from the remaining detector transducers. In addition, the composite signal may include only one output response signal from the detectors when a single detector monopole response is desired.

In this preferred embodiment, the remotely controlled composite signal means provides electronic switching of the outputs from the detectors to form a composite signal using summing/differencing amplifiers. The composite signal is representative of the remotely requested borehole-propagation detection mode. Consequently, the receiver sonde of this embodiment is capable of remote multi-mode operation.

In this embodiment, the composite signal is then sent up-hole by an electronics package 86 within the receiver section to a surface recording system. The composite signal is then processed by various methods to determine information about the formations which the acoustic tool passed through.

From the physical configuration of the four detectors shown in FIG. 7 and in consideration of the common signal polarity of the output response signal from the detectors of this particular embodiment, the multi-mode receiving apparatus may obtain the following composite signal modes as an output from the remotely controlled composite signal means of the electronics package 82: (1) the detection of any one of the signals from detector elements 66a, 66b, 66c and 66d, (2) the summation of all of the signals will provide a monopole composite signal, (3) subtracting (that is, reversing the polarity) the signal of 66a from the signal of 66c, or subtracting the signal of 66b from the signal of 66d will provide a dipole response, and (4) subtracting the signal of 66a from the signal of 66b and adding that response to the signal obtained by subtracting the signal of 66c from the signal of 66d will provide a quadrupole response. Similar combinations of signals could be made in other embodiments which feature additional detectors combination pairs to provide composite signals for other borehole-propagation detection modes.

In another embodiment, the receiver electronics section may not process the individual signals through the composite signal means; but instead, the electronics section provides for each individual output response signal to be transmitted to the surface so that through processing of the individual signals, many different types of composite signals are obtainable from a group of output response signals. In this way, many borehole-propagation detection modes may be analyzed. Additionally, the remotely controlled composite signal means of the electronics package 84 may be programmed in other embodiments so that both composite dipole signals, i.e., dipole signals orthogonal to each other from the same receiver station, are transmitted to the surface. 15 In another embodiment, instead of a remotely controlled composite signal means, the composite signal means may be selected by physically arranging the wiring of the composite signal means to a specific detection mode at the surface before starting a logging run. 20 While several embodiments of the invention have been shown and described, it will be understood that the invention is not limited thereto since many modifications may be made and will become apparent to those skilled in the art.

What is claimed is:

1. A method for reducing the effects of noise on composite signals obtained with a receiver sonde in a liquid containing borehole, the noise being present in the borehole and including at least one of two types of said noise, the two types of noise being a road-noise and a tool-mode noise, the method comprising the steps of:
   (a) attaching transducers to chassis to form receiver stations;
   (b) separating the receiver stations from each other with compliant spacers, the compliant spacers being in contact with the chassis and forming a junction having a disparity in elastic properties where the compliant spacers and chassis are in contact;
   (c) disposing the receiver stations and the compliant spacers longitudinally within the sonde to form a semi-rigid receiver array;
   (d) separating the semi-rigid receiver array from the rest of the sonde with said compliant spacers;
   (e) locating the sonde within the liquid containing borehole;
   (f) generating acoustic waves within the borehole, the acoustic waves providing the input acoustic signal to each transducer of said transducers;
   (g) decoupling the noise in the borehole as it propagates along the semi-rigid receiver array by absorbing the noise as it propagates across each compliant spacer and scattering the noise at it attempts to propagate across each said junction having a disparity in elastic properties;
   (h) producing an output response signal from each said transducer from the input acoustic signal, the output response signal having a reduced amount of noise on the response signal as a result of the decoupling of the noise along the semi-rigid receiver array; and
   (i) selectively combining output response signals from each receiver station to form a composite signal for each said receiver station.

2. The method for reducing the effects of noise on composite signals in accordance with claim 1, wherein:
   step (c) also includes, positioning a non-receiving chassis at each end of the semi-rigid receiver array, each non-receiving chassis being separated from an adjacent said receiver station by a compliant spacer, each said compliant spacer being in contact with the non-receiving chassis and forming another junction having a disparity in elastic properties, this said junction being formed where the non-receiving chassis and said compliant spacer are in contact; and
   step (d) includes separating the non-receiving chassis element located at each end of the semi-rigid receiver array from the rest of the sonde with said compliant spacer between each said non-receiving chassis element and the rest of the sonde.

3. The method for reducing the effects of noise on composite signals in accordance with claim 1, wherein:
   step (a) also includes, selecting transducers poled in the thickness expansion mode and attaching each transducer to the chassis such that each said transducer is poled in the same radial direction with respect to the chassis.

4. The method for reducing the effects of noise on composite signals in accordance with claim 3, wherein:
   step (a) also includes, grounding the transducers to have a common electrical ground by selecting chassis which have a conductive path and attaching the transducers to the chassis such that the transducers are connected to the conductive path to establish the common electrical ground on each said chassis, whereby, the output response signals of each said receiver station have a common polarity with respect to each other; and
   step (a) additionally includes, grounding the receiver stations together to establish a common electrical ground by connecting the common electrical ground on each said receiver station together, whereby, the composite signal of each said receiver has a common polarity with respect to other said composite signals.

5. The method for reducing noise on composite signals according to claim 4, wherein:
   step (a) also includes, providing multi-mode receiver stations by attaching the transducers to each said chassis in paired combinations to provide a multi-mode receiver station, a paired combination being two transducers positioned on opposite sides of the chassis with each said transducer of the paired combination being equally spaced axially around the periphery of the chassis with respect to the other said transducers; and step (h) also includes, detecting a selected bore-hole propagation mode by selectively combining the output response signals from each said receiver station such that the composite signal is representative of the selected borehole-propagation mode.

6. The method for reducing the effects of noise on composite signals according to claim 5, wherein:
   step (a) also includes, selecting transducers which are pressure sensitive, flat, piezoelectric transducers; and
   step (a) additionally includes, establishing the common ground on each said chassis by selecting the chassis to have a conductive metal for the conductive path, and attaching the piezoelectric transducers to the chassis by plating an inner face of each said transducer with a conductive electrode and bonding the inner face to the conductive metal of the chassis.

7. The method for reducing the effects of noise on composite signals according to claim 6, wherein:
   step (b) also includes, separating the receiver station with compliant spacers having approximately the same length, whereby the receiver stations are longitudinally separated from each other by approximately the same distance;
   step (a) also includes, selecting piezoelectric transducers which are small in comparison to the distance between the transducers on separated said receiver stations, whereby the small transducers approach a point source for detecting the input acoustic signal;
   step (g) also includes, producing the output response signals to have an accurate indication of spatial resolution between the output response signals of the separate receiver stations; and
   step (h) also includes, providing spacial resolution between the composite signals by combining output response signals having an accurate indication of spacial resolution between the output response signals of the separate receiver stations.

8. The method for reducing the effects of noise on composite signals according to claim 5, wherein:
   step (a) also includes, selecting an operating bandwidth for the composite signals and selecting the transducers to have a wide-band response over the selected operating bandwidth for the composite signals by choosing transducers which have a lowest resonant-response region for each selected transducer that is above the selected operating bandwidth, each said selected transducer having approximately the same lowest resonant-response region, each said selected transducer also having a flat frequency response region over the selected operating bandwidth.

9. The method for reducing the effects of noise on composite signals according to claim 8, wherein:
   step (a) also includes, selecting transducers which have a lowest resonant frequency for each said transducer that is at least ten times greater than the highest frequency in the selected operating bandwidth, each said transducer having approximately the same lowest resonant frequency.

10. The method for reducing the effects of noise on composite signals according to claim 8, wherein:
    step (a) also includes, selecting transducers which are pressure sensitive, flat, piezoelectric transducers; and
    step (a) additionally includes, establishing the common ground on each said chassis by selecting the chassis to have a conductive metal for the conductive path, and attaching the piezoelectric transducers to the chassis by plating an inner face of each said transducer with a conductive electrode and bonding the inner face to the conductive metal of the chassis.

11. The method for reducing the effects of noise on composite signals according to claim 10, wherein:
    step (b) also includes, separating the receiver station with compliant spacers having approximately the same length, whereby the receiver stations are longitudinally separated from each other by approximately the same distance;
    step (a) also includes, selecting piezoelectric transducers which are small in comparison to the distance between the transducers on separated said receiver stations, whereby the small transducers approach a point source for detecting the input acoustic signal;
    step (g) also includes, producing the output response signals to have an accurate indication of spatial resolution between the output response signals of the separate receiver stations; and
    step (h) also includes, providing spacial resolution between the composite signals by combining output response signals having an accurate indication of spacial resolution between the output response signals of the separate receiver stations.

12. The method for reducing the effects of noise on composite signals according to claim 10, wherein:
    step (a) also includes, selecting transducers which have a lowest resonant frequency for each said transducer that is at least ten times greater than the highest frequency in the selected operating bandwidth, each said transducer having approximately the same lowest resonant frequency.

13. A receiver sonde adapted for reducing the effects of noise on composite signals that are detected by the sonde in a liquid containing borehole, the noise affecting the composite signals in the borehole includes at least one of two types of noise, the two types of noise being a road-noise and a tool-mode noise, the receiver sonde comprising:
    a top bulkhead and a bottom bulkhead;
    a semi-rigid receiver array, the semi-rigid receiver array including receiver stations and compliant spacers;
    each said receiver station having a chassis with transducers attached thereon, each transducer of the transducers being functional to produce an output response signal from an input acoustic signal;
    the compliant spacers are in contact with and separate the chassis from the top bulkhead, the bottom bulkhead, and each other, the compliant spacers maintaining the chassis in an approximately fixed longitudinal position between the top bulkhead and the bottom bulkhead and enabling the receiver array to be semi-rigid, each compliant spacer of the compliant spacers being functional to decouple the noise propagating within the semi-rigid receiver array by acting as a vibration isolator to absorb the noise at it propagates across each said compliant spacer and by forming a junction having a large disparity in elastic properties where each said compliant spacer contacts the chassis, each said junction scattering the noise to reduce the amount of noise which propagates across the junction, whereby, the amount of noise that reaches the transducers is reduced, thereby, reducing the amount of noise that is coupled to each output response signal; and a composite signal means for combining the output response signal of each said transducer to provide a composite signal for each said receiver station.

14. The receiver sonde adapted for reducing the effects of noise on composite signals in accordance with claim 13 wherein the compliant spacers are annular rubber sleeves.

15. The receiver sonde adapted for reducing the effects of noise on composite signals in accordance with claim 13 wherein each said transducer is poled in the thickness expansion mode and each said transducer is attached to the chassis such that each said transducer is poled in the same radial direction with respect to the center of the chassis.

16. The receiver sonde adapted for reducing the effects of noise on composite signals in accordance with claim 15, also comprising:

an electrical connection between the receiver stations;

wherein each said transducer has an inner face with respect to the chassis;

wherein each said chassis has a conductive path, the inner face of each said transducer being connected to the conductive path to establish a common electrical ground such that the output response signal from each said transducer attached to the chassis has a common polarity with respect to all output response signals of the chassis; and the electrical connection between the receiver stations establishes a common electrical ground such that each said composite signal has a common polarity with respect to the other composite signals.

17. The receiver sonde adapted for reducing the effects of noise on composite signals in accordance with claim 16, also comprising:

an electronics package; and wherein the transducers are attached to the chassis in paired combinations to provide a multi-mode receiver station, a paired combination being two transducers positioned on opposite sides of the chassis with each said transducer of the paired combination being equally spaced axially around the periphery of the chassis with respect to the other said transducers, whereby the output response signals from the transducers are selectively combined by the composite signal means within the electronics package to form the composite signal for each said receiver station, the composite signal being representative of a borehole-propagation mode.

18. The receiver sonde adapted for reducing the effects of noise on composite signals in accordance with claim 16, also comprising:

an electronics package;

wherein the transducers are attached to the chassis in paired combinations to provide a multi-mode receiver station, a paired combination being two transducers positioned on opposite sides of the chassis with each said transducer of the paired combination being equally spaced axially around the periphery of the chassis with respect to the other said transducers; and wherein the composite signal means is a remotely controllable composite signal means, whereby the output response signals are combined within the electronics package to form the composite signal for each said receiver station, the composite signal being representative of a borehole-propagation mode selected by the remotely controllable composite signal means.

19. The receiver sonde adapted for reducing the effects of noise on composite signals in accordance with claim 17 wherein:

each said transducer is a pressure sensitive, flat, piezoelectric transducer;

the chassis includes a conductive metal; and the common electrical ground is established by plating the inner face of each said piezoelectric transducer with a conductive electrode and bonding the inner face of each said piezoelectric transducer to the conductive metal of the chassis.

20. The receiver sonde adapted for reducing the effects of noise on composite signals in accordance with claim 19, also comprising:

a charge amplifier for amplifying the output response signal from each said transducer before the output response signal enters the composite signal means of the electronics package.

21. The receiver sonde adapted for reducing the effects of noise on composite signals in accordance with claim 19 wherein:

each said compliant spacer that separates the receiver stations has approximately the same length whereby the receiver stations are longitudinally separated from each other by approximately the same distance; and each said piezoelectric transducer is reduced in size such that the size of each said transducer is small with respect to the distance between the transducers on separate said receiver stations, whereby, the transducers approach a point source, so that, when the output response signals from each said receiver station are combined to form the composite signal, a more accurate indication of spatial resolution between the composite signals is provided by the sonde.

22. The receiver sonde adapted for reducing the effects of noise on composite signals in accordance with claim 21, also comprising:

a charge amplifier for amplifying the output response signal from each said transducer before the output response signal enters the composite signal means of the electronics package.

23. The receiver sonde adapted for reducing the effects of noise on composite signals in accordance with claim 19, also comprising:

an inner jacket is included in the semi-rigid receiver array, the inner jacket surrounding the compliant spacers and the chassis and acting as a barrier between the liquid in the borehole and the interior of the semi-rigid receiver array; and an insulating fluid within the interior of the semi-rigid receiver array.

24. The receiver sonde adapted for reducing the effects of noise on composite signals in accordance with claim 23 wherein the inner jacket is an elastomeric boot.

25. The receiver sonde adapted for reducing the effects of noise on composite signals in accordance with claim 19 wherein each said transducer has frequency response characteristics to an input acoustic signal which includes a lowest resonant-response region which is above the highest frequency within a selected operation bandwidth for the composite signals, whereby, the transducer is functional to provide an approximately constant ratio in amplitude and substantially little phase difference between the output response signal from the transducer and the input acoustic signal to the transducer, thus, the transducer produces the output response signal to be a faithful representation of the input acoustic signal.

26. The receiver sonde adapted for reducing the effects noise on composite signals in accordance with claim 25 wherein each said transducer has a lowest resonant frequency which of each said transducer is at least ten times greater than the highest frequency within the selected operating bandwidth.

27. The receiver sonde adapted for reducing the effects of noise on composite signals in accordance with claim 13, the sonde also comprising:
   the semi-rigid receiver array also including non-receiving chassis;
   a first non-receiving chassis is positioned between the receiver stations and the top bulkhead;
   a second non-receiving chassis is positioned between the receiver stations and the bottom bulkhead; and
   wherein the compliant spacers separate the non-receiving chassis from the top bulkhead, the bottom bulkhead and the chassis, the compliant spacers being in contact with the non-receiving chassis and maintaining the non-receiving chassis in an approximate fixed longitudinal position between the top bulkhead and the bottom bulkhead and enabling the receiver array to be semi-rigid, each said compliant spacer in contact with the non-receiving chassis forming another junction having a larger disparity in elastic properties where each said compliant spacer contacts the non-receiving chassis.

28. The receiver sonde adapted for reducing the effects of noise on composite signals in accordance with claim 27 wherein the compliant spacers are annular rubber sleeves.

29. The receiver sonde adapted for reducing the effects of noise on composite signals in accordance with claim 27 wherein each said transducer is poled in the thickness expansion mode and each said transducer is attached to the chassis such that each said transducer is poled in the same radial direction with respect to the center of the chassis.

30. The receiver sonde adapted for reducing the effects of noise on composite signals in accordance with claim 29, also comprising:
   an electrical connection between the receiver stations;
   wherein each said transducer has an inner face with respect to the chassis;
   wherein each said chassis has a conductive path, the inner face of each said transducer being connected to the conductive path to establish a common electrical ground such that the output response signal from each said transducer attached to the chassis has a common polarity with respect to all output response signals of the chassis; and
   the electrical connection between the receiver stations establishes a common electrical ground such that each said composite signal has a common polarity with respect to the other composite signals.

31. The receiver sonde adapted for reducing the effects of noise on composite signals in accordance with claim 30, also comprising:
   an electronics package; and
   wherein the transducers are attached to the chassis in paired combinations to provide a multi-mode receiver station, a paired combination being two transducers positioned on opposite sides of the chassis with each said transducer of the paired combination being equally spaced axially around the periphery of the chassis with respect to the other said transducers, whereby the output response signals from the transducers are selectively combined by the composite signal means within the electronics package to form the composite signal for each said receiver station, the composite signal being representative of a borehole-propagation mode.

32. The receiver sonde adapted for reducing the effects of noise on composite signals in accordance with claim 30, also comprising:
   an electronics package;
   wherein the transducers are attached to the chassis in paired combinations to provide a multi-mode receiver station, a paired combination being two transducers positioned on opposite sides of the chassis with each said transducer of the paired combination being equally spaced axially around the periphery of the chassis with respect to the other said transducers; and
   wherein the composite signal means is a remotely controllable composite signal means, whereby the output response signals are combined within the electronics package to form the composite signal for each said receiver station, the composite signal being representative of a borehole-propagation mode selected by the remotely controllable composite signal means.

33. The receiver sonde adapted for reducing the effects of noise on composite signals in accordance with claim 31 wherein:
   each said transducer is a pressure sensitive, flat, piezoelectric transducer;
   the chassis includes a conductive metal; and
   the common electrical ground is established by plating the inner face of each said piezoelectric transducer with a conductive electrode and bonding the inner face of each said piezoelectric transducer to the conductive metal of the chassis.

34. The receiver sonde adapted for reducing the effects of noise on composite signals in accordance with claim 33, also comprising:
   a charge amplifier for amplifying the output response signal from each said transducer before the output response signal enters the composite signal means of the electronics package.

35. The receiver sonde adapted for reducing the effects of noise on composite signals in accordance with claim 33 wherein:
   each said compliant spacer which separates the receiver stations has approximately the same length whereby the receiver stations are longitudinally separated from each other by approximately the same distance;
   each said piezoelectric transducer is reduced in size such that the size of each said transducer is small with respect to the distance between the transducers on separate said receiver stations, whereby, the transducers approach a point source, so that, when the output response signals from each said receiver station are combined to form the composite signal, a more accurate indication of spatial resolution between the composite signals is provided by the sonde.

36. The receiver sonde adapted for reducing the effects of noise on composite signals in accordance with claim 35, also comprising:
a charge amplifier for amplifying the output response signal from each said transducer before the output response signal enters the composite signal means of the electronics package.

37. The receiver sonde adapted for reducing the effects of noise on composite signals in accordance with claim 33, also comprising:
an inner jacket is included in the semi-rigid receiver array, the inner jacket surrounding the compliant spacers and the chassis and acting as a barrier between the liquid in the borehole and the interior of the semi-rigid receiver array; and
an insulating fluid within the interior of the semi-rigid receiver array.

38. The receiver sonde adapted for reducing the effects of noise on composite signals in accordance with claim 37 wherein the inner jacket is an elastomeric boot.

39. The receiver sonde adapted for reducing the effects of noise on composite signals in accordance with claim 33 wherein each said transducer has frequency response characteristics to an input acoustic signal which includes a lowest resonant-response region which is above the highest frequency within a selected operation bandwidth for the composite signals, whereby, the transducer is functional to provide an approximately constant ratio in amplitude and substantially little phase difference between the output response signal from the transducer and the input acoustic signal to the transducer, thus, the transducer produces the output response signal to be a faithful representation of the input acoustic signal.

40. The receiver sonde adapted for reducing the effects of noise on composite signals in accordance with claim 39 wherein each said transducer has a lowest resonant frequency which is at least ten times greater than the highest frequency within the selected operating bandwidth.

41. A receiver sonde adapted for reducing the effects of noise on output response signals which are representative of borehole acoustic signals in a liquid containing borehole, the noise affecting the output response signals in the borehole includes at least one of two types of noise, the two types of noise being a road-noise and a tool-mode noise, the receiver sonde comprising:
a top bulkhead and a bottom bulkhead;
a semi-rigid receiver array, the semi-rigid receiver array including at least one receiver station and compliant spacers;
each said receiver station having a chassis with transducers attached thereon, each transducer of the transducers being functional to produce the an output response signal from an input acoustic signal; and
the compliant spacers are in contact with and separate the chassis from the top bulkhead, the bottom bulkhead, and each other, the compliant spacers maintaining the chassis in an approximately fixed longitudinal position between the top bulkhead and the bottom bulkhead and enabling the receiver array to be semi-rigid, each compliant spacer of the compliant spacers being functional to decouple the noise propagating within the semi-rigid receiver array by acting as a vibration isolator to absorb the noise at it propagates across each said compliant spacer and by forming a junction having a large disparity in elastic properties where each said compliant spacer contacts the chassis, each said junction scattering the noise to reduce the amount of noise which propagates across the junction, whereby, the amount of noise that reaches the transducers is reduced, thereby, reducing the amount of noise that is coupled to each output response signal.

42. The receiver sonde adapted for reducing the effects of noise on output response signals in accordance with claim 41 wherein the compliant spacers are annular rubber sleeves.

43. The receiver sonde adapted for reducing the effects of noise on output response signals in accordance with claim 41, the sonde also comprising:
the semi-rigid receiver array also including non-receiving chassis;
a first non-receiving chassis is positioned between the chassis and the top bulkhead;
a second non-receiving chassis is positioned between the chassis and the bottom bulkhead; and
wherein the compliant spacers separate the non-receiving chassis from the top bulkhead, the bottom bulkhead and the chassis, the compliant spacers being in contact with the non-receiving chassis and maintaining the non-receiving chassis in an approximate fixed longitudinal position between the top bulkhead and the bottom bulkhead and enabling the receiver array to be semi-rigid, each said compliant spacer in contact with the non-receiving chassis forming another junction having a larger disparity in elastic properties where each said compliant spacer contacts the non-receiving chassis.

* * * * *